Aug. 22, 1944.   C. O. COZZENS ET AL   2,356,148
OPHTHALMIC MOUNTING
Filed Feb. 27, 1940   2 Sheets-Sheet 1
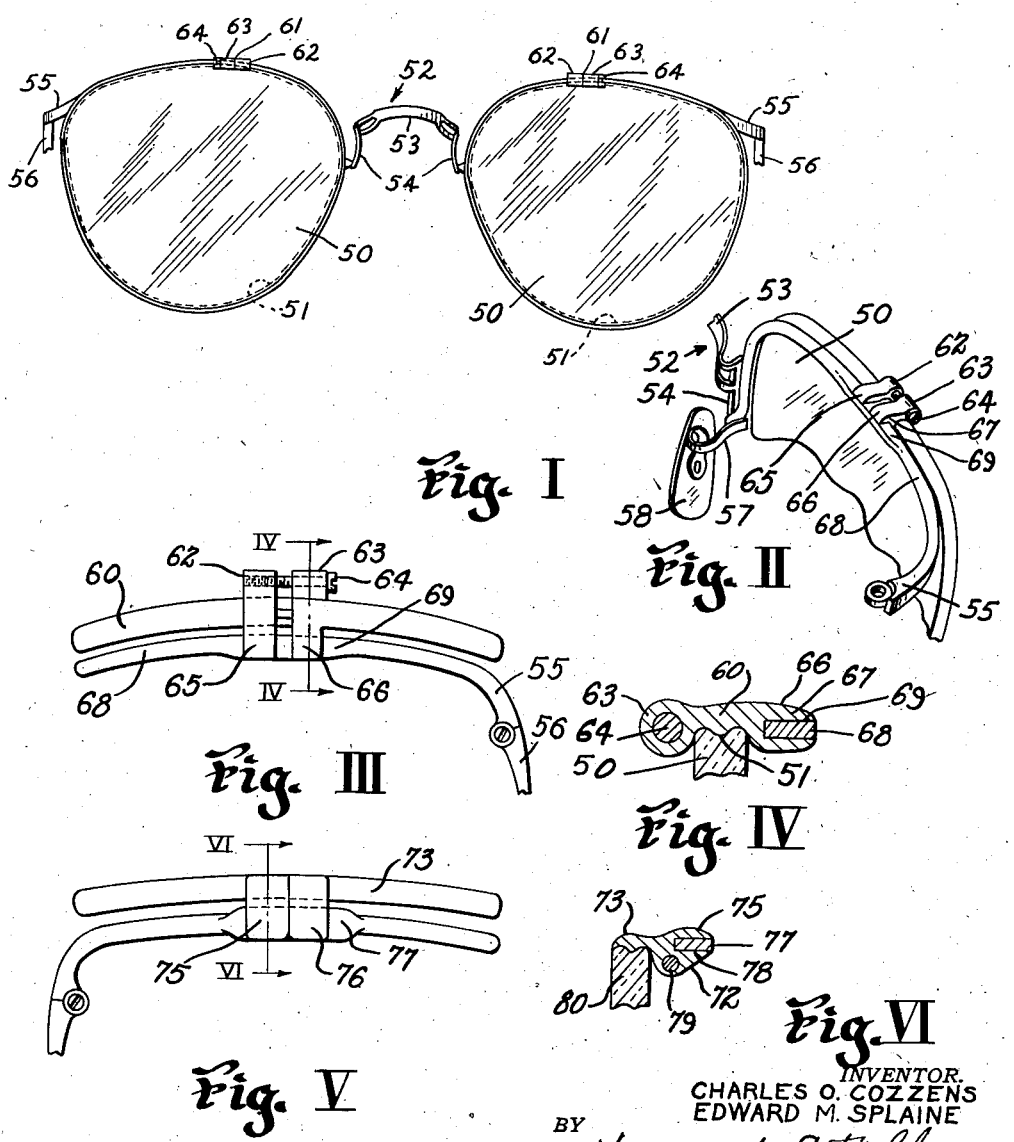

Aug. 22, 1944.   C. O. COZZENS ET AL   2,356,148
OPHTHALMIC MOUNTING
Filed Feb. 27, 1940   2 Sheets-Sheet 2
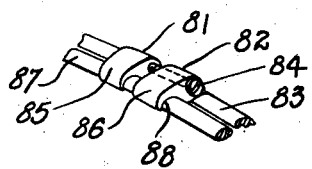
Fig. VII
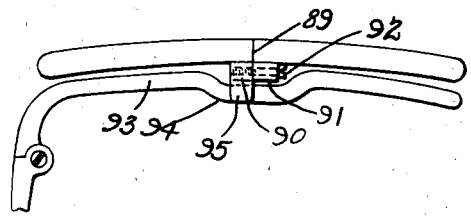
Fig. VIII
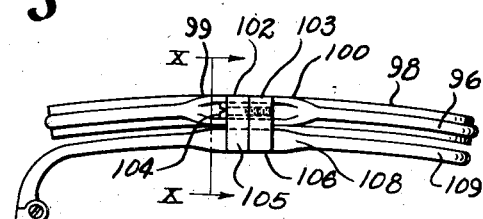
Fig. IX
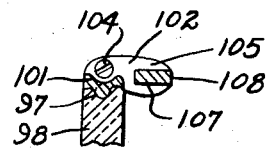
Fig. X
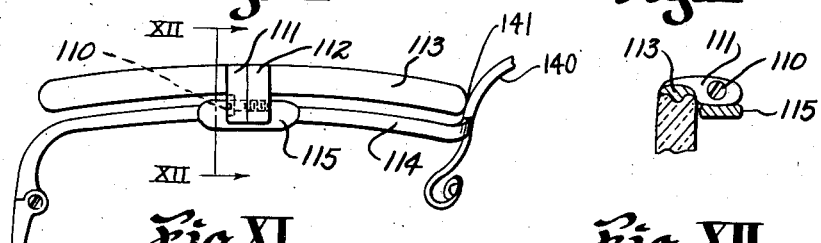
Fig. XI   Fig. XII
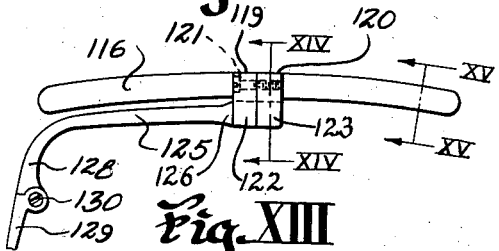
Fig. XIII
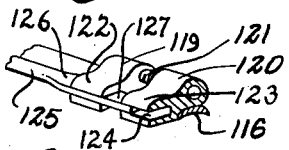
Fig. XIV
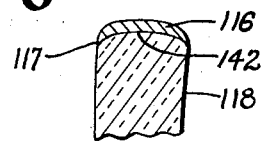
Fig. XV
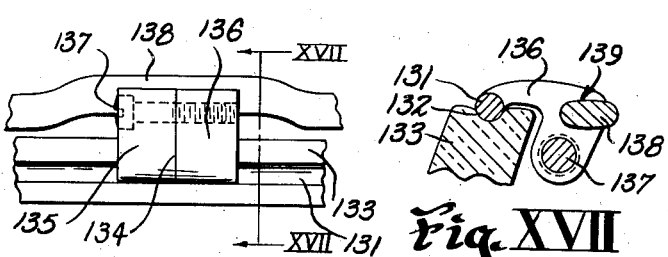
Fig. XVI   Fig. XVII
INVENTOR.
CHARLES O. COZZENS
EDWARD M. SPLAINE
BY Harry H. Styll
ATTORNEY.

Patented Aug. 22, 1944

2,356,148

UNITED STATES PATENT OFFICE 2,356,148

OPHTHALMIC MOUNTING

Charles O. Cozzens and Edward M. Splaine, Southbridge, Mass., assignors to American Optical Company, Southbridge, Mass., a voluntary association of Massachusetts Application February 27, 1940, Serial No. 321,081

7 Claims. (Cl. 88—41)

This invention relates to ophthalmic mountings and has particular reference to an improved construction of mounting.

One of the principal objects of the invention is to provide an ophthalmic mounting of the type having lens supporting rims encircling the lenses whereby the said rims will be relatively inconspicuous and substantially invisible when in assembled relation with the lenses and to provide a relatively rigid and adjustable supporting structure for said lenses and rims.

Another important object is to provide an ophthalmic mounting of the above character with combined lens supporting rims and relatively long and slender adjustable temple supports shaped to follow substantially the upper portions of said rims whereby the said rims will be relatively inconspicuous or substantially invisible when in assembled relation with the lenses and the said temple supports will also be substantially invisible when the mounting is on the face.

Another object is to provide a mounting of the above character with divided lens supporting rims having connecting means adjacent the divided ends thereof cooperating with a part of the relatively rigid and adjustable supporting structure to aid in retaining said associated parts in desired assembled relation with each other.

Another object is to provide novel arrangements for joining the dividing portions of the lens supporting rims whereby the joining means will be relatively inconspicuous in the completed mounting and in many instances will afford means for retaining the parts in desired relation with each other during the use of the mounting.

Another object is to provide various different constructions whereby the said rims will be relatively inconspicuous or substantially invisible during use.

Another object is to provide an ophthalmic mounting of the above character with novel means for joining the meeting ends of the divided lens rims of the mounting and relatively long and slender temple supports having portions in cooperative relation with end means for joining the meeting ends of the lens rims and retaining said relatively long and slender temple supports in desired relation with said rims.

Another object is to provide an ophthalmic mounting of the above character with lens supporting means which do not necessitate the forming of connection openings in the lenses and to provide a relatively rigid and durable supporting structure for said lens holding means and lenses which may be adjusted to the facial requirements of different individuals.

Other objects and advantages of the invention will become apparent from the following description taken in connection with the accompanying drawings and it will be apparent that many changes may be made in the details of construction and arrangement of parts shown and described without departing from the spirit of the invention as set forth in the accompanying claims. We, therefore, do not wish to be limited to the exact arrangement of parts and details of construction shown and described as the preferred forms only have been given by way of illustration.

One of the most desirable types of ophthalmic mountings is a mounting having rim members shaped to fit about the contour edges of the lenses for supporting said lenses in assembled relation with the mounting. Such rims, however, in most instances in the past, and in order to obtain the strength and durability required, were formed of relatively heavy rim members. The use of heavy rim members was inherently necessary because of the fact that it has been usual in the past to connect the associated parts of the mounting, such as the bridge members, nose pad supporting arms and temple supports to the rims. The rims, therefore, had to be sufficiently rigid and durable so as to permanently support the parts in adjusted relation with each other. Some attempts have been made to reduce the cross-sectional size of the lens rims. This would overcome the bulky appearance of the mounting but, because of the fact that the associated parts of the mounting were connected directly to said rims an exceedingly weak and fragile construction resulted.

Because of the fact that the associated parts of the mounting, such as the bridge or nose pad supporting arms and temple supports, were secured directly to the rims, adjustment of the parts without distortion of the rims was exceedingly difficult and such adjustments were also greatly limited in scope. It, therefore, is one of the primary objects of this invention to provide an ophthalmic mounting having lens supporting rims encircling the lenses whereby the said rims may be reduced in cross-section so that when in assembled relation with the lenses, they will be relatively inconspicuous and substantially invisible and to provide a supporting structure for said rims and lenses which has a wide latitude of adjustment and which will rigidly and durably retain the lenses, as well as the associated parts of the mounting, in desired adjusted relation with each other and which will overcome all of the above difficulties while maintaining the advantages of prior art rim type mountings.

One of the advantages of rim type constructions is that it avoids the necessity of forming connection openings in the lenses which, in the past, caused a great loss of lenses due to friction either during the forming of connection openings in the lenses, or during the connection of lens straps to the lenses or due to breakage during use.

Referring to the drawings:

Fig. I is a fragmentary front view of an ophthalmic mounting embodying the invention;

Fig. II is a fragmentary perspective view of the construction illustrated in Fig. I showing the parts slightly separated;

Fig. III is a plan view of the construction illustrated in Fig. II;

Fig. IV is a sectional view taken as on line IV—IV of Fig. III looking in the direction indicated by the arrows;

Fig. V is a plan view of a modified form of the invention;

Fig. VI is a sectional view taken as on line VI—VI of Fig. V and looking in the direction indicated by the arrows;

Fig. VII is a fragmentary view generally similar to Fig. II of another modified form of the invention;

Fig. VIII is a view generally similar to Fig. V of another modification;

Fig. IX is a view generally similar to Fig. III of a further modification;

Fig. X is a fragmentary sectional view taken as on line X—X of Fig. IX.

Fig. XI is a view generally similar to Fig. VIII of a still further modification;

Fig. XII is a fragmentary sectional view taken as on line XII—XII of Fig. XI and looking in the direction indicated by the arrows;

Fig. XIII is a view generally similar to Fig. XI of a still further modification;

Fig. XIV is a fragmentary perspective view of a section taken as on line XIV—XIV of Fig. XIII;

Fig. XV is an enlarged fragmentary sectional view taken as on line XV—XV of Fig. XIII;

Fig. XVI is a fragmentary plan view of another modification; and

Fig. XVII is a sectional view taken as on line XVII—XVII of Fig. XVI and looking in the direction indicated by the arrows.

Referring more particularly to the drawings wherein like characters of reference designate like parts throughout the several views, the device embodying the invention, as illustrated in Figs. I to IV inclusive, comprises a pair of lenses 50, each having relatively shallow grooves 51 formed throughout the contour edge thereof. The said grooves 51 are adapted to receive relatively slender lens rims 60 which are so dimensioned as to cross-sectional size as to be relatively inconspicuous when in assembled relation with said lenses. The lenses 50 and the lens rims 60 are held before the eyes by a supporting structure which comprises a bridge member 52 having a central arch portion 53 and depending side portions 54. The side portions 54 are secured to the ends of relatively long and slender temple supports 68, by soldering, welding or the like. The relatively long and slender temple supports 68 are shaped to follow substantially the upper contour edges of the lenses and are provided with outwardly and rearwardly extending temple connection ends 55 to which suitable temples 56 are pivotally attached.

Rearwardly extending nose pad supporting arms 57 are secured to the temple supports 68 adjacent the bridge connection, and are adapted to support, at their opposite ends, suitable nose pads 58.

The rearwardly extending temple connection ends 55 are preferably located above the useful field of side vision or above the centers of the pupils of the eyes when the mounting is in position on the face of the wearer. The central arch portion and depending side portions of the bridge afford means of adjustment whereby the distance between the centers of the lenses may be changed. The rearwardly extending nose pad supporting arms 57 provide means whereby the nose bearing pads 58 carried thereby may be adjusted to fit the nose of the wearer.

In making, assembling and fitting a mounting of the above character to the requirements of an individual suitable lenses 50 having the prescriptive requirements of the individual are edged to size and shape and are provided with a peripheral groove 51 substantially centrally of the contour edge thereof. The lenses are then secured within the lens rims 60 as set forth above. The bridge member 52 is then adjusted to move the lenses to desired spaced relation with each other, as required by the individual, and to position the lenses in desired aligned relation with each other. The relatively long and slender temple supports are then adjusted to follow substantially the upper contour edges of the lenses. The nose pad supporting arms 57 are then adjusted to fit the nose pads to the nose of the wearer and to support the lenses in desired position before the eyes of the wearer. The temple connection ends 55 are then bent upwardly or downwardly to dispose the temples at a desired angular relation with respect to the plane of the lenses when the said temples are extended. The said temple connection ends 55 are then bent inwardly or outwardly to space the temples to the requirements of the individual. It is to be noted that the adjustment of the nose pad supporting arms 57 may be made independently of the bridge, that is, without altering the adjustment of the bridge and the adjustment of the relatively long and slender temple supports 68 and the temple connection ends 55 may be made without altering the adjustment of the nose pad supporting arms 57. With this arrangement, it is not necessary to form any connection openings in the lenses.

Lens rims 60 of the inconspicuous type, such as set forth above, are provided with a divided portion 61 at the top of the lenses. The divided ends of the portion 61 are provided with lugs 62 and 63, which are connected by a screw or the like 64. The lugs 62 and 63 have rearwardly extending portions 65 and 66 provided with transversely extending grooves 67 therein. In this instance, the relatively long and slender temple supports 68 are each provided with a flattened area 69 shaped to lie within the groove 67 of the rearwardly extending portions 65 and 66. One of the rearwardly extending portions 65 or 66 is preferably joined with the temple support 68, as by soldering, welding or the like, and the other of said rearwardly extending portions is adapted to loosely receive the temple support 68 internally of its groove portion 67. This arrangement provides means for allowing the lugs 62 and 63 to be separated with the flattened area 69 fitting within the groove 67 providing means for guiding the lugs 62 and 63 into alignment with each other. The lens rims 60 are preferably supported only at the upper edge thereof by the lugs 65 and 66 and not directly connected to the bridge or pad arm. However, if desired, they may have a second support at the bridge or temple sides thereof.

In Figs. V and VI there is illustrated a slight modification of the construction illustrated in Figs. I to IV inclusive wherein connection lugs 72 simulating the lugs 62 and 63 are positioned in the rear of the lens rim 73 and beneath the rearwardly extending portions 75 and 76 which simulate the portions 65 and 66. The flattened area 77 of the relatively long and slender temple support is fitted within grooves 78 formed transversely of said rearwardly extending portions 75 and 76. A suitable screw or the like 79 is used to draw the lugs 72 into adjacent relation with each other. It is to be understood that the assembly, shown in Fig. VI, functions in a manner generally similar to that illustrated in Figs. I to IV inclusive, that is, the portion 75 is preferably joined with the flattened area 77 as by soldering or welding and the said temple support is adapted to loosely fit the groove 78 of portion 76 to permit the lugs 72 to be separated for the insertion of the lens 80 inwardly of the lens rim 73.

In Fig. VII there is illustrated another modification wherein lugs 81 and 82, simulating the lugs 62 and 63, are secured to the divided ends of the lens rim 83. Suitable connection means, such as a screw or the like 84, is adapted to hold the lugs in assembled relation with each other. The lugs 81 and 82 are preferably secured to the upper edge surface of the lens rim 83 and are provided with rearwardly extending portions 85 and 86 simulating the portions 65 and 66. In this instance, the relatively long and slender temple support 87 is secured to the rearwardly extending portion 85, as by soldering or welding. The other of said rearwardly extending portions 86 is provided with a hook-like end 88 loosely fitting over the relatively long and slender temple support 87. If desired, the said rearwardly extending portion 86 may be provided with a flat under surface engaging an adjacent flat surface formed on the relatively long and slender temple support 87. In each instance, the portion 86 would function as guide means for aligning the lugs 81 and 82 when it is desired to join them by the connecting means 84.

Fig. VIII is a view generally similar to Fig. V of a further modification. In this instance, the divided ends of the lens rims 89 are provided with perforated lugs 90 and 91 joined by connecting means such as a screw 92. The lugs 90 and 91 preferably lie in the rear of the upper portions of the lens rims 89 and are so dimensioned as to be substantially invisible during use. The long and slender temple support 93, in this instance, is provided with a deflected portion 94 shaped to fit about the lugs 90 and 91. The deflected portion 94 is such that the opposed portions of the support 93 may be placed in adjacent relation with the lens rim 89. If desired, one of the lugs 90 or 91 may be provided with a rearwardly extending grooved portion 95 simulating the portion 66, illustrated in Fig. III, in which the deflected portion 94 of the arm may be loosely fitted with the said arm being secured to the other of said lugs. In this instance, the deflected portion 94 may be loosely or rigidly attached in the groove of the portion 95.

In Figs. IX and X there is illustrated a further modification wherein the lens rims 96 are shaped to fit within a relatively shallow groove 97 formed in the outer contour edge of the lens 98. In this instance, the divided ends 99 and 100 of the rims are enlarged and each has an upper concaved surface 101. Suitable lugs 102 and 103 are secured to said enlarged portions 99 and 100. The lugs are secured together by a screw or the like 104. Each of the lugs is provided with a rearwardly extending portion 105 and 106. The said rearwardly extending portions are provided with transversely extending grooves 107 in which the flattened areas 108 of the relatively long and slender temple supports 109 are fitted. One of the rearwardly extending portions is rigidly secured to the flattened area 108 as by soldering or welding and the said flattened area is loosely fitted within the groove of said other rearwardly extending portion. The said groove functions to align the lugs 102 and 103 with each other for the reception of the screw 104.

In Figs. XI and XII there is illustrated a further modification simulating the construction illustrated in Fig. VII except that the screw 110 which joins the lugs 111 and 112 lies in the rear of the lens rim 113. The relatively long and slender temple support 114, in this instance, is provided with a flattened area 115 adapted to lie beneath the rearwardly extending portions of the lugs 111 and 112. It is to be understood that one or the other of said rearwardly extending lugs may be secured to the flattened area 115 with the said area being loosely fitted beneath the other of said lugs, with the resiliency of the support 114 tending to retain the flattened area 115 in engagement with said other of the lugs. It is to be understood that the lens rim 113 may bear against the bridge 140, as shown at 141, or they may be integrally connected, or entirely separated, as desired.

In Figs. XIII to XV inclusive there is shown a further modification wherein the lens rim 116 is formed of relatively thin ribbon-like material having its opposed edges angularly disposed, as illustrated at 117, to form a relatively wide channel-like groove 142 to receive the contour edge of the lens 118. The rim 116 is divided and is provided adjacent its meeting ends with a pair of lugs 119 and 120. The lugs 119 and 120 are preferably soldered or welded to the divided ends of the rim. Suitable connecting means, such as a screw 121, is employed for securing the lugs together. The lugs are provided with rearwardly extending portions 122 and 123 each having a transverse groove 124 therein. The lugs 119 and 120 are preferably located centrally at the top of the rim 116. The long and slender temple support 125, having a flattened end 126, is preferably secured to the lug 119 internally of its transverse groove as by soldering, welding or the like, as illustrated in Figs. XIII and XIV. The end 127 of the portion 126 is slidably fitted within the slot 124 of the lug 120. The groove 124 and the portion 127 function as means for guiding the lugs 119 and 120 into alignment with each other and also provide means for retaining the temple support 125 in adjusted position. The temple support 125, as illustrated in Fig. XIII, extends outwardly from the lug 119 towards the temporal side of the rim 116 and is provided with a rearwardly extending temple connection end 128 to which a temple 129 is pivotally attached, as illustrated at 130. The support 125 preferably lies in the rear of the upper contour edge of the rim.

In Figs. XVI and XVII there is illustrated another modification of the invention comprising a relatively slender wire-like lens rim 131 adapted to fit within a shallow groove 132 formed in the contour edge of the lens 133 so as to be relatively inconspicuous and substantially invisible when in assembled relation with the lens. The rim 131 is divided, as illustrated at 134, and is provided adjacent its meeting ends with connecting lugs 135 and 136 connected by a screw 137. The relatively long and slender temple support 138, in this instance, extends transversely of the lens and is shaped to follow the upper contour edge of the lens and to lie in the rear thereof. The relatively long and slender temple support 138 is fitted within transversely grooved portions 139 and is preferably secured within said groove in one of the lugs 135 or 136 and is adapted to be slidably fitted within the other groove so that the lugs may be separated when it is desired to place a lens in or remove it from the lens rim 131.

In all of the above constructions, the various lens supporting rims are formed so as to be as inconspicuous as possible and yet function properly to support the lenses. The relatively long and slender temple supports are formed to permit adjustment and yet rigidly retain the shape to which they are adjusted. The said supports may be formed of rigid or resilient material or may possess both of said characteristics but in all instances are such that they will permit adjustment. The bridge member for joining the temple supports or for joining the lens supporting rims may be made of any desired shape or design and may be so constructed as to be adjustable either with the use of rigid or resilient materials or with portions thereof possessing both of said characteristics.

It is to be understood that the connecting means for the lens rim may be positioned at any desired location on the lens rim, depending, of course, upon the characteristics of the construction.

It is also to be understood that the various different constructions of lens rims may be used with any of the supporting structures and vice versa.

The general method of making, assembling and fitting applies to all the various constructions set forth above. It is also to be understood that any known type of connecting means may be employed, such as the screw, pin, rivet, solder connected members, and so forth to secure the connecting lugs together. Several of the associated parts may also be formed in integral relation with each other, instead of being formed separate and joined with each other as by soldering, welding or the like.

From the foregoing description, it will be seen that simple, efficient and economical means have been provided for accomplishing all of the objects and advantages of the invention.

Having described our invention, we claim:

1. In a device of the character described, a pair of lenses each having a peripheral groove therein, a split rim member on each of said lenses having a portion lying within said groove, with its ends located centrally of the upper edge of the lens and with a joining lug on each of said ends and a frame structure supporting said rim members through attachment to one of the said lugs of each, comprising a bridge member and a pair of temple supports extending from said bridge member and following the upper contour edges of said lenses to terminate in temple connections, with said lugs each having a relatively small portion secured to the end of the rim in overlying relation with the lens edge and of such a contour as to form a taper increasing from the front to the rear of the lens and a relatively large portion extending rearwardly from said rim with a connection opening therein and connecting means in said opening, and said temple supports each having a reduced portion centrally thereof which is attached to one of said lugs with the temple support in spaced relation with the rim with said attachments being the only connections between the rims and said supporting structure.

2. In a device of the character described, a pair of lenses each having a peripheral surface of a given contour, a split rim member on each of said lenses having an inner surface of complementary contour to the peripheral surface of the lens and interfitting therewith, with its ends located centrally of the upper edge of the lens and with a joining lug on each of said ends and a frame structure supporting said rim members through attachment to one of the said lugs of each, comprising a bridge member and a pair of temple supports extending from said bridge member and following the upper contour edges of said lenses to terminate in temple connections, with said lugs each having a relatively small portion secured to the end of the rim in overlying relation with the lens edge and of such a contour as to form a taper increasing from the front to the rear of the lens and a relatively large portion extending rearwardly from said rim with a connection opening therein and connecting means in said opening, and said temple supports each having a reduced portion centrally thereof which is attached to one of said lugs with the temple support in spaced relation with the rim with said attachments being the only connections between the rims and said supporting structure.

3. In a device of the character described, a pair of lenses each having a peripheral surface of a given contour, a split rim member on each of said lenses having an inner surface of complementary contour to the peripheral surface of the lens and interfitting therewith, and having connecting lugs formed with tapered portions secured thereto and having enlarged portions extending rearwardly of said lenses, a frame structure supporting said lens rims by connection to said rearwardly extending enlarged portions of the lugs and comprising a bridge member and a pair of relatively long and slender temple supports extending therefrom and following the upper contour edges of the lenses to terminate in temple connections, said connection between the frame structure and the said lugs being at a point on said lugs spaced rearwardly from said lens rims and said connections being the only connections between the supporting structure and the lens rims.

4. In a device of the character described, a pair of lenses having peripheral edges of controlled shape, a lens supporting structure for said lenses comprising a pair of lens rims having inner face portions adapted to substantially interfit with peripheral portions of the lenses so that a portion of said rims lies within the peripheral edges of said lenses with the said lenses adapted to be supported in said rims, said rims each having divided end portions, a connecting lug on each of said divided end portions, each of said lugs having a portion overlying the rim adjacent said divided end portions and secured to said rim and a portion extending rearwardly of said rim, means for securing said connecting lugs together, each of said rearwardly extending portions of said lugs having a recess therein, relatively long and slender temple supports each shaped substantially throughout their length to follow substantially the upper contour shape of the lenses and having a temple connection portion adjacent the outer temporal end thereof, said long and slender temple supports each having a portion lying within the recess of and connected with the rearwardly extending portion of one of said connecting lugs and having a portion detachably engaging within the recess of the other of said lugs to aid in retaining said temple support in desired relation with the contour of the lens and bridge means having its opposed sides secured to the lens supporting structure to retain the lens rims in desired spaced relation with each other, the means for securing said lugs together being to one side of and spaced from the longitudinal axis of the long and slender temple support.

5. In a device of the character described, a lens supporting structure for the lenses of an ophthalmic mounting comprising a pair of lens rims having inner face portions adapted to substantially interfit with peripheral portions of the lenses so that a portion of said rims lies within the peripheral edges of said lenses with the said lenses adapted to be supported in said rims, said rims each having divided end portions, a connecting lug on each of said divided end portions, each of said lugs having a portion secured to the rim adjacent the divided portions thereof and a portion extending rearwardly of said rim, means for securing said connecting lugs together, relatively long and slender temple supports each shaped substantially throughout their length to follow substantially the contour of the lens from adjacent the nasal side thereof throughout the upper contour edge thereof and having a temple connection portion adjacent the outer temporal end thereof, one of said lugs having a portion shaped to engage and secured to said long and slender temple support intermediate the ends of said temple support with the other of said lugs being free to be detached from the lug to which the temple support is secured, bridge means having its opposed sides secured to the respective long and slender temple supports adjacent the nasal sides thereof to retain the lens rims in desired spaced relation with each other, the means for securing said lugs together being to one side of and spaced from the longitudinal axis of the long and slender temple support with said connections of the long and slender temple supports to the bridge being the sole means for retaining the lens rims in desired spaced relation with each other.

6. In a device of the character described, a lens supporting structure for the lenses of an ophthalmic mounting comprising a pair of lens rims each having inner face portions adapted to substantially interfit with peripheral portions of the lenses so that a portion of said rims lies within the peripheral edges of said lenses, with the said lenses adapted to be supported in said rims, said rims each having divided end portions, a connecting lug on each of said divided end portions, each of said lugs having a portion overlying and secured to the rim adjacent said divided end portions and tapering rearwardly to enlarged portions extending rearwardly of said rims, means for securing said connecting lugs together, each of said rearwardly extending portions of said lugs having a recess therein, relatively long and slender temple supports each shaped substantially throughout their length to follow substantially the upper contour shape of the lenses and having a temple connection portion adjacent the outer temporal end thereof, said long and slender temple supports each having a portion shaped to lie within the respective recesses with said portion connected to one of said lugs within the recess thereof to retain said temple support in desired relation with the contour of the lens and bridge means having its opposed sides secured to the lens supporting structure to retain the lens rims in desired spaced relation with each other, the means for securing said lugs together being to one side of and spaced from the longitudinal axis of the long and slender temple support.

7. In a device of the character described, a lens supporting structure for lenses of an ophthalmic mounting having peripheral edges with grooves therein, said lens supporting structure comprising a pair of lens rims each having a portion shaped to fit within the respective grooved portions of the lenses, said rims each having divided end portions, a connecting lug adjacent each of said divided end portions, each of said lugs having a portion shaped to overlie the rim and secured to said rim and a portion extending rearwardly of said rim with the major portion thereof lying within the outer peripheral surface of the rim, means for securing said lugs together, relatively long and slender temple supports each shaped substantially throughout their length to follow substantially the upper contour shape of the lenses when in position thereon and having a temple connection portion adjacent the outer temporal end thereof, one of said lugs having a portion shaped to engage and secured to the long and slender temple support at a point to one side of and spaced from the longitudinal axis of the means for securing said lugs together and bridge means having its opposed sides secured to the lens supporting structure to retain the lens rims in desired spaced relation with each other.

CHARLES O. COZZENS.
EDWARD M. SPLAINE.